United States Patent
Ravindranath (10) Patent No.: US 9,124,664 B1
(45) Date of Patent: Sep. 1, 2015

(54) DISTRIBUTING MULTI-PLATFORM CONTENT

(75) Inventor: Vinodh Kumar Ravindranath, Bangalore (IN)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/351,954

(22) Filed: Jan. 17, 2012

Related U.S. Application Data (60) Provisional application No. 61/580,469, filed on Dec. 27, 2011.

(51) Int. Cl.
*G06F 15/16* (2006.01)
*H04L 29/06* (2006.01)
*H04N 21/2343* (2011.01)

(52) U.S. Cl.
CPC .......... *H04L 65/4084* (2013.01); *H04L 65/601* (2013.01); *H04N 21/23439* (2013.01)

(58) Field of Classification Search
USPC .......................... 709/203, 220–224; 717/177
See application file for complete search history.

(56) References Cited

U.S. PATENT DOCUMENTS

| | | | | |
|---|---|---|---|---|
| 6,138,153 A * | 10/2000 | Collins et al. | .................. | 709/221 |
| 7,254,608 B2 | 8/2007 | Yeager et al. | | |
| 7,636,792 B1 * | 12/2009 | Ho | .................. | 709/246 |
| 2005/0096870 A1 * | 5/2005 | Butler | .......................... | 702/183 |
| 2007/0233782 A1 | 10/2007 | Tali | | |
| 2008/0027871 A1 * | 1/2008 | Seo | ................... | 705/59 |
| 2008/0133376 A1 * | 6/2008 | Hill | ............................. | 705/26 |
| 2009/0144708 A1 * | 6/2009 | Deedwaniya et al. | ........ | 717/140 |
| 2010/0211635 A1 | 8/2010 | DeAnna et al. | | |
| 2011/0125838 A1 | 5/2011 | Rao | | |
| 2011/0276863 A1 * | 11/2011 | Bhise et al. | .................... | 715/201 |
| 2012/0167047 A1 * | 6/2012 | Wyler et al. | .................. | 717/122 |
| 2013/0067449 A1 * | 3/2013 | Sannidhanam et al. | ........ | 717/170 |
| 2013/0166777 A1 * | 6/2013 | Chen et al. | .................... | 709/246 |
| 2014/0032636 A1 * | 1/2014 | Nelson | .......................... | 709/203 |

FOREIGN PATENT DOCUMENTS

WO WO2009151730 12/2009

OTHER PUBLICATIONS

Apple—iCloud-Store and back up your content in iCloud; dated Oct. 12, 2011. www.apple.com/icloud/features/apps-books-backup.html.

* cited by examiner

*Primary Examiner* — Joshua Joo
(74) *Attorney, Agent, or Firm* — Young Basile Hanlon & MacFarlane P.C.

(57) ABSTRACT

A system and method are disclosed for loading content such as a software program onto a computing device in a computing environment using a network. Applications are prepared for downloading by using multiple compilers to target an application for multiple computing environments. The multiple compiled applications are assembled into a software container that can be stored on a web server on a network and accessed to download the appropriate application to a computing device depending upon the computing environment available on the computing device.

20 Claims, 5 Drawing Sheets

DISTRIBUTING MULTI-PLATFORM CONTENT

CROSS-REFERENCE TO RELATED APPLICATIONS

This application claims priority to U.S. Provisional Patent Application No. 61/580,469, filed Dec. 27, 2011, which is hereby incorporated by reference in its entirety.

TECHNICAL FIELD

The present invention relates to distribution of applications and other content from central servers to remote devices such as mobile telephones.

BACKGROUND

Handheld computing devices such as the mobile telephones have proliferated in recent years. These devices are in some cases equipped with processors, memory and the capability to communicate through local and wide area networks, including the internet. These devices can include operating systems as well which permit the devices to execute computer application programs, sometimes called "apps." The user of a handheld device can download computer application programs and other content by communication with a server through a mobile telephone phone network or wireless local area network.

SUMMARY

Systems and methods and apparatuses for distributing content to a plurality of differently configured computing environments in a single file are disclosed. Embodiments disclosed herein include methods for distributing content to at least one of a plurality of different computing environments, including processing the content to generate one or more versions of the content, each version compatible with at least one of the plurality of different computing environments; and packaging the one or more versions of the processed content in a single file stored on a computer readable tangible media, the single file arranged to permit at least one of the versions to be selectively extracted from the single file by a computer.

Embodiments disclosed include an apparatus for distributing content to a plurality of computing environments, including a memory and a processor configured to execute instructions stored in the memory to process the content to generate one or more versions of the content, each version compatible with at least one of the plurality of computing environments; and package the one or more versions of the processed content in a single file stored on computer readable media, the single file arranged to permit at least one of the versions to be selectively extracted from the single file.

In an embodiment of this disclosure, an apparatus is provided for distributing content to at least one of a plurality of computing environments. The apparatus includes a memory and a processor configured to execute instructions stored in the memory to receive a single file including one or more versions of the content, each version compatible with at least one of the plurality of computing environments, the single file arranged to permit at least one of the versions to be selectively extracted from the single file.

In yet another embodiment, a computer program product is provided. The computer program product comprises computer readable medium and a single file stored thereon. The single file includes one or more versions of the content. Each version is compatible with at least one of a plurality of computing environments. The single file further includes computer code that, when executed by a computer, permits the computer to selectively extract one of the versions from the container.

BRIEF DESCRIPTION OF THE DRAWINGS

The description herein makes reference to the accompanying drawings wherein like reference numerals refer to like parts throughout the several views, and wherein.

DETAILED DESCRIPTION

To facilitate the distribution of content to different computing environments, embodiments are disclosed herein that permit different versions of content to be stored in a single file in preparation for distribution to various computing environments. In embodiments of this disclosure, the versions are placed into a single file and the single file is distributed to a server, from which versions of the content can be conveniently downloaded to specific computing environments.

Figure 1:
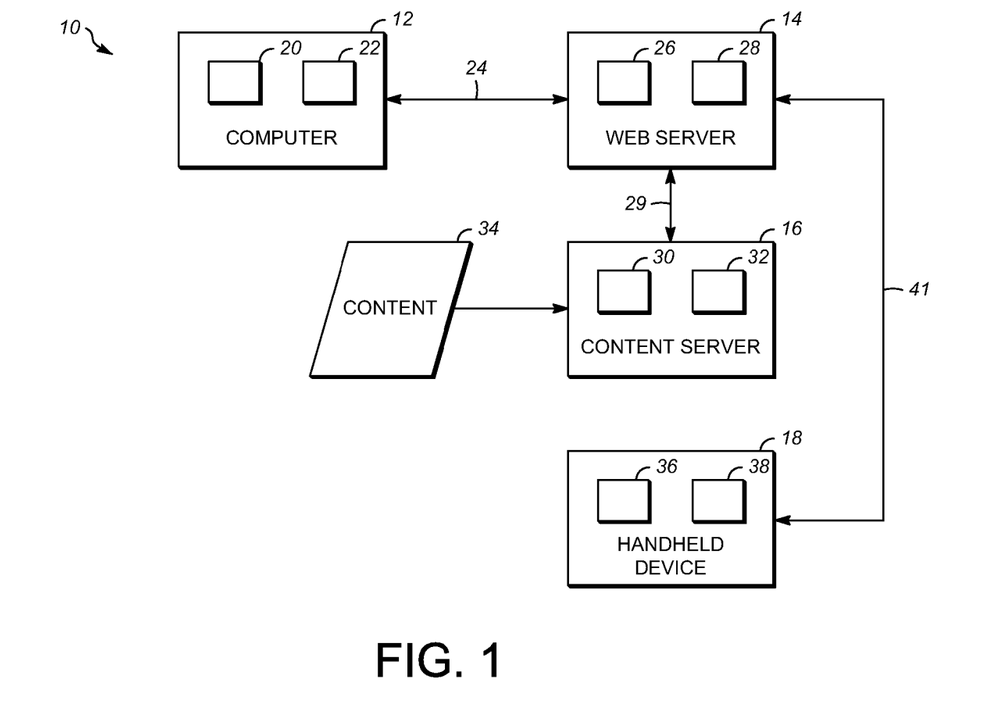
FIG. 1 is a block diagram of a system for distributing content.

FIG. 1 is a block diagram of a system 10 in accordance with a first embodiment of this disclosure. System 10 includes a computer 12, a web server 14, a content server 16 and a handheld device 18. In this case, computer 12 may be a desktop personal computer equipped with a processor 20 (e.g., a CPU) and memory 22 (e.g., random access memory). Computer 12 can also be a laptop, notepad, personal digital assistant, tablet computer, smart phone or any other device that a user finds convenient to use. Computer 12 is coupled via a network 24 such as the internet, for example, to web server 14. Web server 14 includes one or more processors 26 and memory 28. Web server 14 is in communication via a network 29, which may be the internet, with content server 16, which also includes one or more processors 30 and memory 32. In some embodiments of this disclosure the computer 12 and the web server 14 may be implemented on one computing device.

Content server 16 can be configured to permit access to applications and other content 34, resident on or otherwise accessible to content server 16. Content 34 can include application programs such as games or other software, music, images, video or any other type of software or data which a user may wish to download to computing devices such as handheld device 18. All such software and data is referred to herein generically as "content." Communications to and from content server can be implemented in accordance with the hypertext transfer protocol or other protocols Handheld device 18 includes a processor 36 and memory 38. Handheld device 18 is in this case a mobile telephone that is equipped with an operating system, which in this case may be the Android™ operating system published by Google Inc. of Mountain View, Calif. In this embodiment, handheld device 18 communicates with web server 14 via a wireless channel 41 which may be based on the IEEE 802.11 standards. Other types of wired or wireless connections can be used to provide communication between handheld device 18 and web server 14 including the internet.

A user of a handheld device such as device 18 can communicate with content server 16 to request a download of software or other content. This procedure can be cumbersome for some users, however. For example, the interface or bandwidth constraints afforded by the handheld device 18 may not permit comfortable browsing of content for some users. Alternatively, it may be tedious to enter payment information via a handheld device. Alternatively, a user may not have access to a handheld device 18 at the moment when he or she wants to act acquire content to be run on handheld device 18. These limitations can be overcome in system 10 as shown in FIG. 1.

Using computer 12, a user can browse, select and/or purchase desired content from content server 16 which content is intended to be installed on handheld device 18. There may be a variety of reasons why a user desires to use computer 12—as opposed to handheld device 18—to access content on content server 16. For example the size or configuration of computer 12 may offer a more desirable or convenient user interface for a particular user than the interface offered by handheld device 18. Alternatively, the user may desire to access content through computer 12 because he or she is not in possession of handheld device 18 at that particular moment, or due to other constraints, such as limited battery resources or limited network connectivity. In other cases, the computer 12, the web server 14 and the handheld device 18 are parts of an enterprise network, where computer 12 is the station authorized to download content from a content server 16 to the web server 14.

Figure 2:
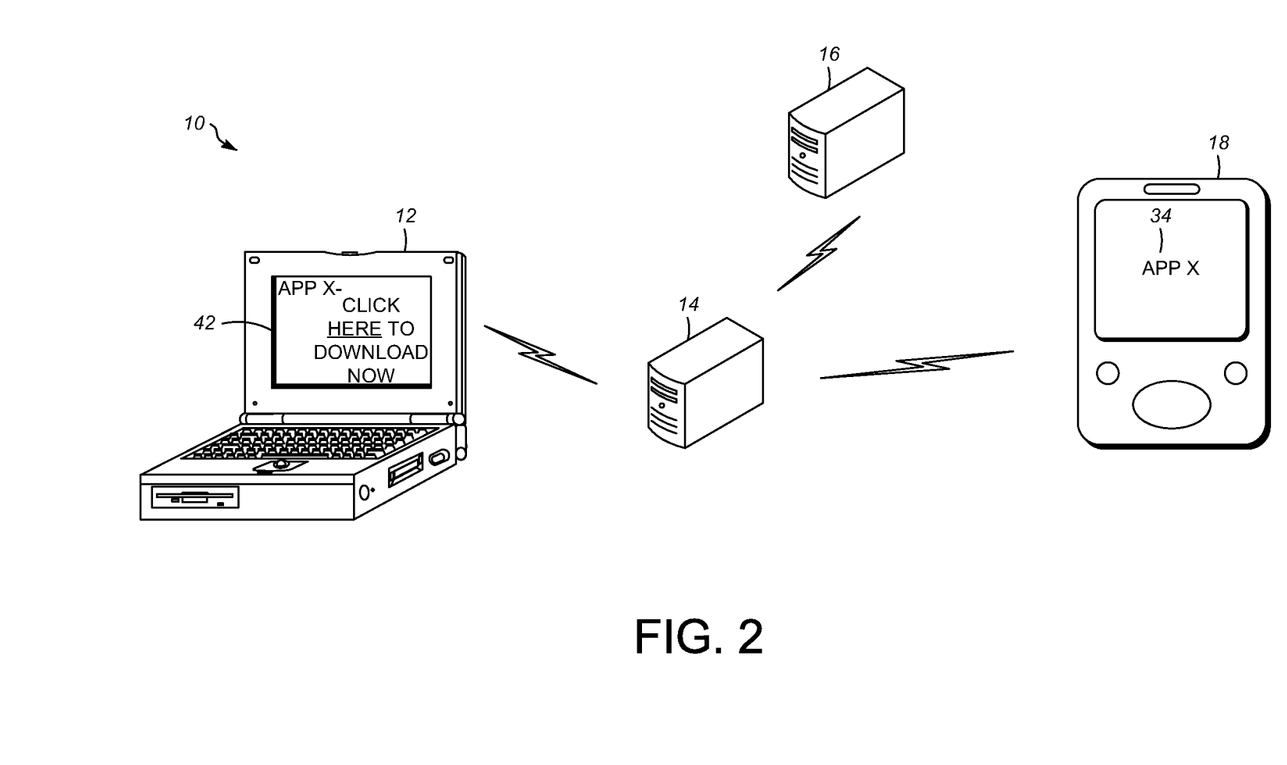
FIG. 2 is a schematic illustration of the use of the system depicted in FIG. 1.

Handheld device 18 can also perform a check-in procedure with web server 14 to transmit device information to the web server 14 which can include information identifying handheld device 18. The check-in procedure can occur daily, monthly, yearly or any other period of time, or irregularly, such as on-demand, on start-up, on wake-up, or on detection of a network connection. For example, the information identifying the handheld device can be an IP address or telephone number assigned to the device. In some cases, the device information includes the hardware description, operating system, or carrier information of handheld device 18. In yet other cases, the hardware description includes at least one of information concerning the presence, absence and/or configuration of the following features: a touchscreen, hardware acceleration, telephony, WIFI capability, 3G compatibility, storage, memory, battery or processor on handheld device 18. Embodiments of this disclosure can use this information to determine compatibility between the computing device which has performed FIG. 2 is a schematic illustration of the use of system 10. In some embodiments of this disclosure, a user of computer 12 can review available content by accessing a webpage hosted by web server 14, which may cause a webpage 42 to be displayed to the user of computer 12. The user of computer 12 can initiate the downloading of content to the web server 14 by clicking an icon or other element on webpage 42. This can result in the transmission of a request from the user's computer 12 to content server 16 that specifies content be downloaded to web server 14. Such a request can specify the content to be downloaded along with information identifying the types of devices that will be expected to execute the application. Such a request can also include configuration information pertaining to the computing environments. Computing environment refers to the hardware and software configuration of a computing device. Alternatively, this configuration information can be stored in advance at web server 14 or at a location accessible by web server 14. For example, the user of computer 12 can enter in the appropriate configuration information via an online form. The configuration information can also be supplied directly or indirectly by handheld device 18 during an initiation process in which the user establishes an account at web server 14. Alternatively, the configuration information can be stored at content server 16 or distributed across both web server 14 and content server 16 or a third, remote location (not shown).

Once the content is downloaded to web server 14, web server 14 can distribute content to handheld device 18 or other device on the network (not shown) in response to a request from the computer 12 or the handheld device 18. The request transmitted to web server 14 can include configuration information pertaining to handheld device, information identifying handheld device 18 (such as a telephone number or IP address) or other authentication information establishing that the request is authentic (that is, originated from a user or machine authorized to download content) and/or the information identifying the particular content that has been requested. In some cases, the device information includes the hardware description, operating system, or carrier information of handheld device 18. In yet other cases, the hardware description includes at least one of information concerning the presence, absence and/or configuration of the following features: a touchscreen, hardware acceleration, telephony, WIFI capability, 3G compatibility, storage, memory, battery or processor on handheld device 18.

Web server 14 can perform authentication and/or validation processing on the request that it receives from computer 12 to determine if it is appropriate to download the requested content to handheld device 18. For example, web server 14 can determine based on the configuration information whether handheld device 18 is equipped with the computing environment required to use the requested content. Web server 14 also determines from the information contained in the request whether the request is authentic, such as for example by determining whether the request emanates from the individual authorized to request downloads of content. Web server 14 may also perform a licensing transaction associated with requested content such as charging a payment source that is previously stored at web server 14 or keeping track of previously purchased end user licenses.

Alternatively, the operations of web server 14 and content server 16 can be consolidated onto a single server. Alternatively, the functions of either web server 14 or content server 16 can be distributed across a number of different machines. Although illustrated for simplicity as unitary machines, it is understood that servers 14 and 16 of system 10 are not necessarily implemented using a single processor or that each of servers 14 and 16 is even implemented in one physical machine.

Because the request for content originates from a user of computer 12, it is possible that handheld device 18 will not be activated and available to receive the requested content when web server 14 fulfills this request. Accordingly, the requested content can be held at web server 14 and transmitted to handheld device 18 at a future time when the handheld device 18 is activated and available. For example, handheld device 18 can be programmed to periodically check-in with the web server when it is activated. In this case, the web server can notify handheld device 18 that requested content is queued for delivery to the handheld device 18. Requested content can then be downloaded to the handheld device 18 from web server 14.

Enterprise computing typically comprises a group of different computing devices, including for example devices with different types of hardware running different operating systems. For example, an enterprise's computing devices may include smartphones, tablet computers and laptop and desktop computers all having different processors with differently sized displays with possibly different configurations of hardware and software. In some cases, the configuration information includes at least one of hardware description, operating system, or carrier information. In yet other cases, the hardware description includes at least one of information concerning the type of touchscreen, hardware acceleration, telephony, WIFI, 3G, storage, memory, battery or processor on the handheld device. Furthermore, for a given hardware configuration, there may be more than one operating system capable of being installed on the hardware. Even in cases where two computing environments have the same hardware and the same type of operating system, they may differ in which version of the operating system they are running. In some cases, a single application cannot run in these different computing environments; the application may require modification or configuration to run on different computing devices having different computing environments.

Applications are often prepared to operate in a particular computing environment by first being rewritten to be compatible with the targeted environment. There exist software development systems that permit code to be written which can then be targeted by the compiler to compile into object code compatible with a different computing environments, but in either case the code generally needs to be re-compiled for each different computing environment. The result is that if it is desired to have a single application available for multiple different computing environments, multiple copies of the application may have to be maintained in parallel. Enterprise management of software applications typically requires that purchasing, distributing, and maintaining applications for groups of different computing environments are centralized. In enterprise management of software applications, the software applications may be desirably downloaded to a central repository, sometimes called a web server, and thereafter made available to users within the enterprise. In this type of enterprise software management, the enterprise may purchase licenses for the software which permit it to be downloaded to multiple users. The enterprise is tasked with making sure that each copy of the application is properly licensed for use. The disclosed embodiments improve purchasing, distributing and maintaining software applications for enterprises which include different computer environments by packaging versions of a software application, modified and compiled for different environments, in a single file.

Figure 3:
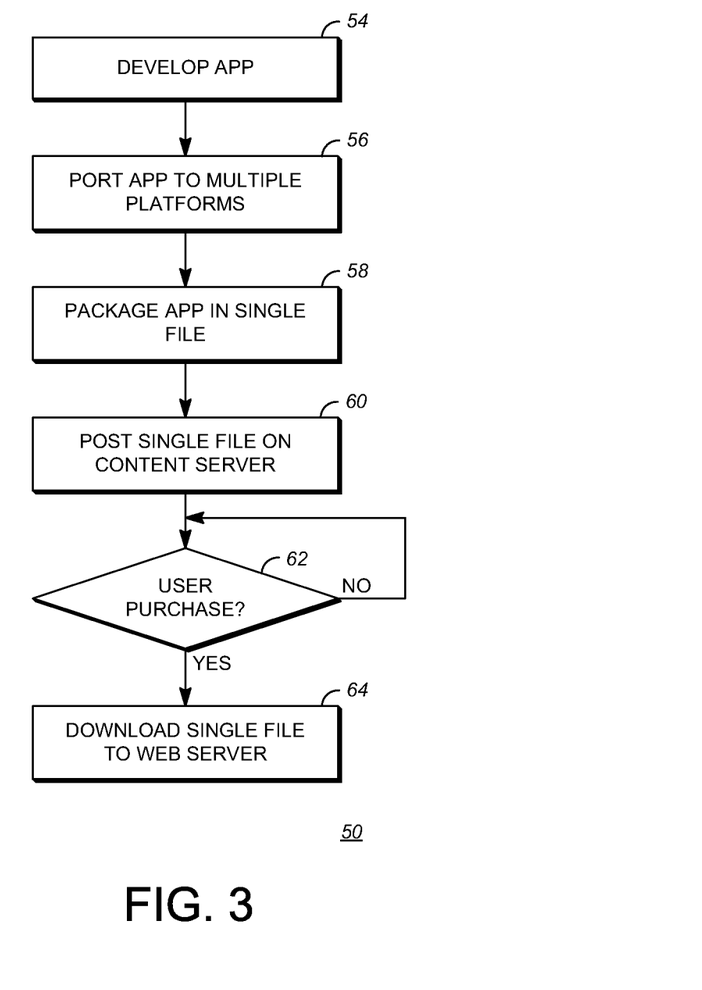
FIG. 3 is a logic flowchart of a process performed by one or more servers in the system of FIG. 1.

FIG. 3 shows a process 50 for packaging multiple apps in a single file. At a step 54 an application is developed. At a step 56, the application is then ported to more than one different computing environments such as by possibly re-writing code or possibly by re-compiling the code with a compiler designed to compile code for the selected target computing environments. The process of porting at step 56 results in the creation of one or more versions intended to be executed on one or more different computing environments. At step 58, these multiple versions of the application are packaged in a software container such as container 72 described below. In some cases, the process of containerization at step 58 can include constructing a file containing each of the compiled versions and maintaining information and links to each version, so that the file can be interrogated to determine that a desired computing environment is supported by an existing version of the software, and the appropriate version selected from the file. At a step 60, the software container is then posted to content server 16 for distribution. Once the software container is posted onto content server 16 it is available for purchase and subsequent downloading by a user, which may be an enterprise. At a decision step 62, when the application is purchased by a user or enterprise the container is downloaded 64 to web server 14, where the single file containing one or more versions of the content makes the appropriate content available for download to computing environments such as handheld device 18.

Figure 4:
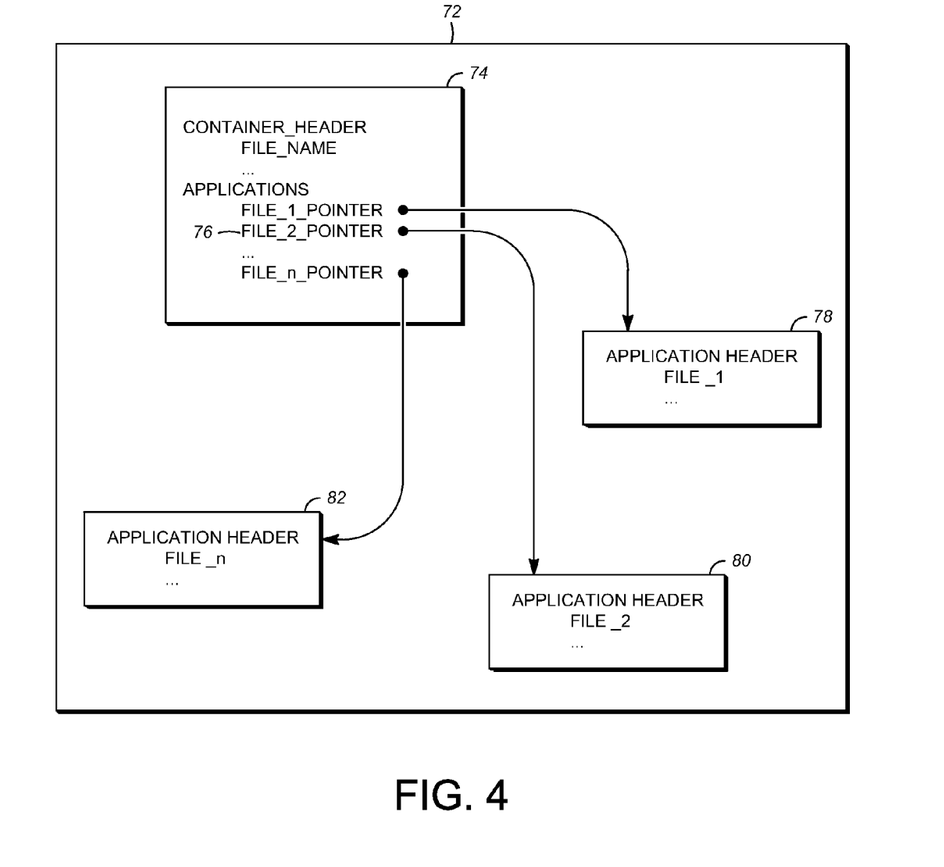
FIG. 4 is a schematic diagram of a software container used in the system of FIG. 1.

FIG. 4 shows an example of a single file 72 constructed according to an embodiment of this invention. Single file 72 contains a container header 74 which may identify the container by file name and also contains pointers 76 to units of content 78, 80, 82. The header 74 may also contain information on which computing environments the units of content 78, 80, 82 have been adapted to execute on and possibly licensing information regarding the units of content. In this case, the units can be versions of an application which have been adapted to operate in particular computing environments. The single file contains information which permits a user to interrogate the single file 72 and obtain information regarding which computing environments the single file 72 contains content for and permits a user to determine if the appropriately adapted version of the content exists in the single file, determine if the content is properly licensed, and then extract the appropriate content and download it to, for example, handheld device 18.

Figure 5:
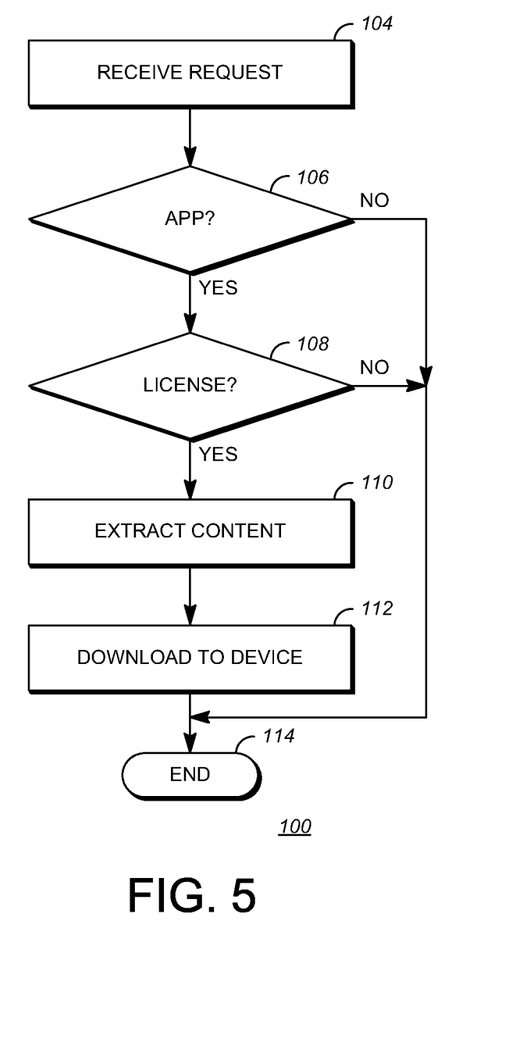
FIG. 5 is a logic flowchart of a process performed by a device in the system of FIG. 1.

Referring to FIGS. 3 and 4, FIG. 5 is a logic flowchart illustrating the process 100 of extracting content from a single file 72. In one embodiment, process 100 can reside in memory 28 and be executed by the CPU 26 on the web server 14. Process 100 begins at a step 104 when the web server 14 hosting the single file 72 receives a request to download content to a computing device, for example a handheld device 18. At a step 104, web server 14 determines from the request which one of the different computing environments (sometimes referred to as the "target device") has been selected to receive the content. This may be the same device that the content is to be downloaded to, or a third party computing device may make the request and manage the download and installation. Alternatively, an update manager running on the network may detect the single file and know that it contains an essential update to be downloaded to computing environments in the enterprise.

At decision step 106, a determination is made as to whether any of the units of content 78, 80, 82 in container 72 are configured to run on the target device selected at block 104. If none of the units of content 78, 80, 82 are configured to run on the target device, processing ends at step 114. Otherwise, if one of the units of content 78, 80, 82 of the application in the container 72 is configured to run on the target device, then at decision step 108, a determination is made as to whether an appropriate license condition exists. For example, the license condition may be that the enterprise has a license to use the content on the target device, or the license condition may be that a certain number of licenses are available and content related to that license can be downloaded until the number of licenses is reached. Based on the determination of this license condition, if the target device is not licensed to use the application, processing ends at step 114. Otherwise, if the target device is licensed to use the application, the selected application is extracted from the container at a step 110 and downloaded to the device at step 112, which may be handheld device 18.

The embodiments of web server 14 and/or content server 16 (and the algorithms, methods, instructions etc. stored thereon and/or executed thereby) can be realized in hardware, software, or any combination thereof including. Suitable hardware includes for example, computers, servers, handheld devices, IP cores, ASICS, programmable logic arrays, optical processors, quantum or molecular processors, programmable logic controllers, microcode, firmware, microcontrollers, servers, microprocessors, digital signal processors or any other circuit or device capable of processing information. In the claims, the term "processor" should be understood as encompassing any the foregoing, either singly or in combination. In one embodiment, for example, web server 14 or content server 16 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method comprising:
   processing content to generate a plurality of versions of the content, each version compatible with at least one of a plurality of different computing environments;
   packaging the plurality of versions in a single file, the single file arranged to permit a version from the plurality of versions to be selectively extracted from the single file;
   storing the single file on a computer readable tangible medium at a first computer;
   receiving, at the first computer, from a second computer, information including a device identifier uniquely identifying the second computer, wherein the second computer is a mobile device, wherein the second computer corresponds to a computing environment from the plurality of different computing environments;
   receiving, from a third computer, information indicating a request for the content;
   in response to the request, identifying the second computer from a plurality of computers based on the device identifier;
   identifying a version of the content that is compatible with the second computer; and
   on a condition that the second computer is configured to communicate with the first computer, distributing the content to the second computer.

2. The method of claim 1, wherein distributing the content to second computer is performed on a condition that a version of the content that is compatible with the third computer is not available.

3. The method of claim 1, wherein distributing the content to second computer is performed on a condition that a version of the content that is compatible with the third computer is available, the method further comprising:
   distributing the content to the third computer.

4. The method of claim 1, wherein the information indicating the request for content includes information indicating a request to purchase the content, and wherein distributing the content to the second computer is performed on a condition that the request to purchase the content is approved.

5. The method of claim 1, wherein receiving the information indicating the request for content includes receiving the information indicating the request for content via a web server.

6. The method of claim 1, further comprising:
   determining whether the second computer is configured to communicate with the first computer;
   in response to a determination that the second computer is not configured to communicate with the first computer, storing an indication of the request for content; and
   in response to receiving an indication from the second computer indicating that the second computer is configured to communicate with the first computer, determining that the second computer is configured to communicate with the first computer.

7. The method of claim 1, wherein identifying the version of the content that is compatible with the second computer includes comparing compatibility information associated with the content to device information associated with the second computer.

8. The method of claim 7, further comprising:
   receiving the device information associated with the second computer from the second computer.

9. The method of claim 7, further comprising:
   receiving the device information associated with the second computer from the third computer.

10. The method of claim 9, wherein receiving the information including the device identifier includes receiving the device information associated with the second computer.

11. The method of claim 1, wherein identifying the second computer includes determining whether the information indicating the request for content is associated with an authorization to distribute content to the second computer.

12. The method of claim 1, wherein identifying the version of the content that is compatible with the second computer includes extracting the version of the content that is compatible with the second computer from the single file, wherein the single file includes another version of the content that is incompatible with the second computer.

13. The method of claim 1, distributing the content to the second computer includes:
   transmitting the content to the second computer; and
   initiating an installation of the content on the second computer.

14. The method of claim 1, further comprising:
   receiving, by the first computer, the content from a fourth computer.

15. The method of claim 14, wherein receiving the content includes:
   receiving, from a fourth computer, a request to generate a content container associated with the content;
   receiving, from the fourth computer, the version of the content that is compatible with the second computer and a request to associate the version of the content that is compatible with the second computer with the content container;

receiving, from the fourth computer, another version of the content that is incompatible with the second computer and a request to associate the version of the content that is incompatible with the second computer with the content container; and transmitting information to the third computer, the information indicating the content and indicating that the content contain includes the version of the content that is compatible with the second computer.

16. The method of claim 1, wherein receiving information indicating the request for content does not include receiving information uniquely identifying the second computer.

17. A method comprising:
receiving, at a server, from a first computer, a request to generate a content container associated with content, the content processed at the first computer to generate a plurality of versions of the content, each version compatible with at least one of a plurality of different computing environments;
receiving, from the first computer, a version of the content that is compatible with a mobile device type;
associating the version of the content that is compatible with the mobile device type with the content container;
receiving, from the first computer, a version of the content that is incompatible with the mobile device type;
associating the version of the content that is incompatible with the mobile device type with the content container;
receiving, from a mobile device of the mobile device type, information including a device identifier uniquely identifying the mobile device;
receiving, from a second computer, a request for information;
identifying an association between the request for information and the mobile device;
transmitting information to the second computer, information indicating the content;
receiving, from the second computer, information indicating a request for the content;
identifying the mobile device from a plurality of devices based on the device identifier and the association between the request for information and the mobile device;
identifying the version of the content that is compatible with the mobile device type; and
on a condition that the mobile device is configured to communicate with the server, distributing the content to the mobile device.

18. The method of claim 17, further comprising:
distributing the content to the second computer.

19. The method of claim 17, further comprising:
determining whether the mobile device is configured to communicate with the server;
in response to a determination that the mobile device is not configured to communicate with the server, storing an indication of the request for content; and
in response to receiving an indication from the mobile device indicating that the mobile device is configured to communicate with the server, determining that the mobile device is configured to communicate with the server.

20. A method comprising:
receiving, at a server, from a first computer, a request to generate a content container associated with content, the content processed at the first computer to generate a plurality of versions of the content, each version compatible with at least one of a plurality of different computing environments;
receiving, from the first computer, a version of the content that is compatible with a mobile device type;
associating the version of the content that is compatible with the mobile device type with the content container;
receiving, from the first computer, a version of the content that is incompatible with the mobile device type;
associating the version of the content that is incompatible with the mobile device type with the content container;
receiving, from a mobile device of the mobile device type, information including a device identifier uniquely identifying the mobile device;
receiving, from a second computer, a request for information;
identifying an association between the request for information and the mobile device;
transmitting information to the second computer, information indicating the content;
receiving, from the second computer, information indicating a request for the content;
identifying the mobile device from a plurality of devices based on the device identifier and the association between the request for information and the mobile device;
identifying the version of the content that is compatible with the mobile device type;
distributing the content to the second computer;
determining whether the mobile device is configured to communicate with the server;
in response to a determination that the mobile device is not configured to communicate with the server, storing an indication of the request for content; and
in response to receiving an indication from the mobile device indicating that the mobile device is configured to communicate with the server, distributing the content to the mobile device.

* * * * *